July 5, 1932.  M. R. MANDELBAUM  1,865,474
REFINING HYDROCARBONS
Filed July 29, 1930
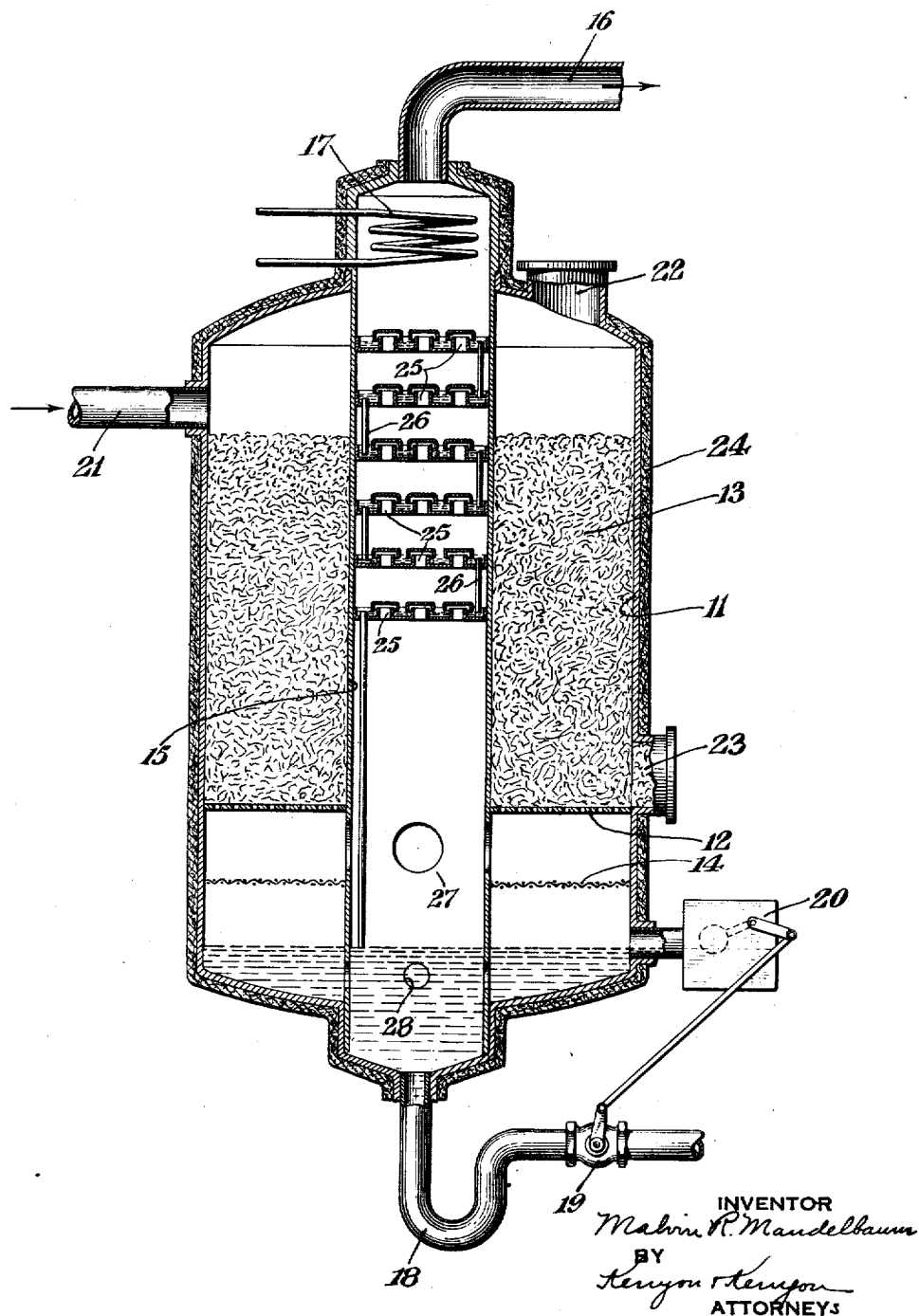
INVENTOR
Malvin R. Mandelbaum
BY
Kenyon & Kenyon
ATTORNEYS Patented July 5, 1932

1,865,474

UNITED STATES PATENT OFFICE

MALVIN R. MANDELBAUM, OF ELIZABETH, NEW JERSEY, ASSIGNOR TO THE GRAY PROCESSES CORPORATION, OF NEWARK, NEW JERSEY, A CORPORATION OF DELAWARE

REFINING HYDROCARBONS

Application filed July 29, 1930. Serial No. 471,451.

This invention relates to the art of refining hydrocarbons and more especially to the vapor phase refining of cracked petroleum products by contact with adsorptive materials.

In a method of vapor phase refining of cracked petroleum products, the products are caused to pass through a body of solid adsorptive material supported within a treating tower for free drainage. During the contacting step, polymerization of unstable, unsaturated hydrocarbons contained in the vapors takes place. The polymers thus formed have a higher boiling point than the vapors and consequently as the vapors being treated are maintained at or near their boiling point under the conditions of treatment, the polymers liquefy in the treating material and are separated from the treated vapors. The vapors to be treated are supplied either from a re-run still where the cracked products are redistilled or directly from a cracking unit. In either case, it is advisable to interpose a fractionating tower between the distilling system and the treating tower so that only that fraction which is desired in the final refined product is passed through the adsorptive material. The adsorptive material most common in commercial use is fuller's earth, although other adsorptive material having similar selective polymerizing qualities may be used.

It has been found that the efficiency of the refining process and the quality of final product are improved by adding a fractionating step after the refining or polymerizing step. Heretofore, this has been accomplished by introducing between the treating tower and the condenser used for condensing the treated vapors, a secondary fractionating tower usually of the bubble cap type. By passing the treated vapors through such a tower any polymers entrained in the vapor are removed and improvement in quality is obtained by refluxing the liquid collecting in such secondary fractionating tower.

The use of a secondary fractionating tower, however, has several disadvantages. First, it adds to the expense of the equipment where, as is usual in the case of a treating tower directly connected to a cracking unit, the operation is carried on under considerable pressure and the secondary fractionating tower has to be built to withstand such pressure. Second, there is a larger heat loss in the secondary tower even where it is well insulated than is necessary for the amount of separation it is usually desired to accomplish. Finally, due to this heat loss, it is difficult properly to regulate the amount of reflux which contacts with the vapors and which during normal operation should be kept very low.

This invention has for an object a combined treating and secondary fractionating tower which obviates the disadvantages above enumerated.

Other objects, novel features and advantages of this invention will be apparent from the following specification and accompanying drawing, wherein the single figure is a vertical section through an apparatus embodying the invention.

The treating tower 11 is provided near its bottom with a shelf 12 permeable to fluids, but impermeable to solids on which is supported a body of treating material 13, which is preferably fuller's earth, but which may be any solid adsorptive material capable of causing selective polymerization of unstable, unsaturated compounds present in cracked hydrocarbons. Between the plate 12 and the bottom of the treating tower 11 there is provided a screen 14. A tube 15 is arranged centrally of the treating tower 11 and its upper end preferably passes through the top of the tower. The upper end of the tube 15 is provided with a vapor outlet pipe 16 and within the tube near its upper end is arranged a coil 17. At the lower end of the tube 15 there is provided a trapped draw-off line 18 controlled by a valve 19 preferably actuated by a liquid level control 20. The tower 11 is provided with a vapor inlet 21, a charging manhead 22 and a discharging manhead 23. Preferably the treating tower is covered with a layer 24 of heat insulating material.

The tube 15 is provided with bubble trays 25 and conductors 26 such as are commonly used in fractionating towers for insuring contact between liquids and vapors. In the tube 15 apertures 27 are provided between the plate 12 and the screen 14 and other apertures 28 are provided near the bottom.

In the operation of this apparatus, the vapor inlet 21 is connected with a source of cracked hydrocarbon vapors which may be a fractionating tower connected to a cracking still or a re-run still. The vapor outlet 16 is connected to a condenser (not shown) for condensing and cooling the refined vapors. The draw-off line 18 may be connected to a tank or the effluent liquids may be pumped back to the fractionating tower of the distilling system or to any other part of the system for re-treatment.

The vapors entering the treating tower pass through the adsorptive material 13, thereby causing the unstable, unsaturated constituents of the vapors to be polymerized to higher boiling point compounds which condense and drain through the shelf 12 along with the vapors. The vapors then pass through the apertures 27 into the tube 15 and rise up through the fractionating column. Here they come in contact with reflux liquid either introduced as such through the coil 17 which in that case is perforated or produced by condensation of the vapors in contact with the coil which may be cooled by the circulation of the cooling medium therethrough. The treated and refined vapors are then passed through the pipe 16 to the condenser. Polymers draining from the treating material, together with condensate from the fractionating tower are collected in the base of the latter and are withdrawn through the pipe 18, the level of liquid in the bottom of the tower being maintained uniform by means of the control mechanism 20. The screen 14 tends to prevent the vapors from entraining liquid from the condensate collecting in the bottom of the tower.

It will be noted that by using an inner tower for the final fractionation of the treated vapors only the end of the fractionating tower extending outside the shell of the treating tower need be strongly built as there is no substantial pressure difference between the inside and outside of that part of the fractionating column which is located within the treating tower. Moreover, not only is there no heat loss since the tower is jacketed by vapors, but the exothermic nature of the reaction taking place in the adsorptive material supplies enough heat to make it possible to dispense with the reboiling ordinarily necessary to secure efficient stripping of gasoline from the reflux material. Since there is no heat loss due to radiation, the amount of reflux required can be accurately supplied at the top of the tower by means of the cooling coil or the perforated coil.

As has been previously pointed out, the above apparatus may be used in re-run or cracking distillation systems and at any desired pressure. The treating material may be fuller's earth or any other similar material which will cause the polymerization of the unstable, unsaturated constituents of the vapors and may have admixed with it a desulphurizing material.

I claim:

1. In combination, a shell, a fractionating tower arranged within said shell and forming a chamber therewith, means within said chamber having communication with the treating material for free drainage, said chamber having communication with the lower portion of said fractionating tower, a vapor inlet into said chamber, and a vapor outlet from said fractionating tower.

2. In combination, a shell, a fractionating column within said shell and forming a chamber therewith, means within said chamber for supporting solid adsorptive treating material for free drainage, said chamber having communication with the lower portion of said fractionating column, a vapor inlet into said chamber, a vapor outlet from said fractionating column, and means for draining liquid from said chamber and fractionating column.

3. In combination, a cylindrical shell, a bubble tower arranged within said shell and forming a chamber therewith, means within said chamber for supporting solid adsorptive material for free drainage, said chamber having communication with the lower portion of said bubble tower, means for introducing vapors into said chamber, and means for withdrawing vapors from said bubble tower.

4. In combination, a cylindrical shell, a bubble tower arranged within said shell and forming a chamber therewith, means within said chamber for supporting solid adsorptive material for free drainage, said chamber having communication with the lower portion of said bubble tower, means for introducing vapors into said chamber, means for withdrawing vapors from said bubble tower, and means for draining liquid from said bubble tower and chamber.

5. In combination, a shell, a tower within said shell and forming a chamber therewith, means within said chamber for supporting solid adsorptive material for free drainage, said chamber having communication with the lower portion of said tower, bubble trays within said tower, means for introducing vapors into said chamber, and means for withdrawing vapors from said tower.

6. In combination, a shell, a tower within said shell and forming a chamber therewith, means within said chamber for supporting solid adsorptive material for free drainage, said chamber having communication with the lower portion of said tower, bubble trays within said tower, means for introducing vapors into said chamber, means for withdrawing vapors from said tower, and means for supplying reflux liquid to the top of said tower.

7. In combination, a shell, a tower arranged within said shell and forming a chamber therewith, means within said chamber for supporting solid adsorptive material for free drainage, said chamber having communication with the lower portion of said bubble tower, means for introducing vapors into said chamber, means for withdrawing vapors from said tower, and means within said tower for effecting fractional condensation of vapors passing therethrough.

8. In combination, a shell, a tower within said shell and forming a chamber therewith, means within said chamber for supporting solid adsorptive material for free drainage, said chamber having communication with the lower portion of said tower, means for introducing vapors into said chamber, means for withdrawing vapors from said tower, means within said tower for effecting fractional condensation of vapors passing therethrough, and means for draining liquid from said chamber and tower.

9. In combination, a shell, a fractionating column arranged within said shell and forming a chamber therewith, means within said chamber for supporting solid adsorptive material for free drainage, said chamber having communication with said column below the lower portion of said fractionating column, means for supplying vapor to said chamber, means for withdrawing vapor from said fractionating column, and means controlled by the level of liquid in said shell for draining liquid from said chamber and column.

In testimony whereof, I have signed my name to this specification.

MALVIN R. MANDELBAUM.

CERTIFICATE OF CORRECTION.

Patent No. 1,865,474.            July 5, 1932.

MALVIN R. MANDELBAUM.

It is hereby certified that error appears in the printed specification of the above numbered patent requiring correction as follows: Page 2, line 11, claim 1, strike out the words "having communication with the" and insert instead for supporting solid adsorptive; and that the said Letters Patent should be read with this correction therein that the same may conform to the record of the case in the Patent Office.

Signed and sealed this 11th day of October, A. D. 1932.

(Seal)

M. J. Moore,
Acting Commissioner of Patents.

for supplying reflux liquid to the top of said tower.

7. In combination, a shell, a tower arranged within said shell and forming a chamber therewith, means within said chamber for supporting solid adsorptive material for free drainage, said chamber having communication with the lower portion of said bubble tower, means for introducing vapors into said chamber, means for withdrawing vapors from said tower, and means within said tower for effecting fractional condensation of vapors passing therethrough.

8. In combination, a shell, a tower within said shell and forming a chamber therewith, means within said chamber for supporting solid adsorptive material for free drainage, said chamber having communication with the lower portion of said tower, means for introducing vapors into said chamber, means for withdrawing vapors from said tower, means within said tower for effecting fractional condensation of vapors passing therethrough, and means for draining liquid from said chamber and tower.

9. In combination, a shell, a fractionating column arranged within said shell and forming a chamber therewith, means within said chamber for supporting solid adsorptive material for free drainage, said chamber having communication with said column below the lower portion of said fractionating column, means for supplying vapor to said chamber, means for withdrawing vapor from said fractionating column, and means controlled by the level of liquid in said shell for draining liquid from said chamber and column.

In testimony whereof, I have signed my name to this specification.

MALVIN R. MANDELBAUM.

CERTIFICATE OF CORRECTION.

Patent No. 1,865,474.　　　　　　　　　　　　　　　　　　　　July 5, 1932.

MALVIN R. MANDELBAUM.

It is hereby certified that error appears in the printed specification of the above numbered patent requiring correction as follows: Page 2, line 11, claim 1, strike out the words "having communication with the" and insert instead for supporting solid adsorptive; and that the said Letters Patent should be read with this correction therein that the same may conform to the record of the case in the Patent Office.

Signed and sealed this 11th day of October, A. D. 1932.

(Seal)　　　　　　　　　　　　　　　　　　　　　　　　　　M. J. Moore,
　　　　　　　　　　　　　　　　　　　　　　　　　Acting Commissioner of Patents.

CERTIFICATE OF CORRECTION.

Patent No. 1,865,474.

July 5, 1932.

MALVIN R. MANDELBAUM.

It is hereby certified that error appears in the printed specification of the above numbered patent requiring correction as follows: Page 2, line 11, claim 1, strike out the words "having communication with the" and insert instead for supporting solid adsorptive; and that the said Letters Patent should be read with this correction therein that the same may conform to the record of the case in the Patent Office.

Signed and sealed this 11th day of October, A. D. 1932.

(Seal)

M. J. Moore,
Acting Commissioner of Patents.

DISCLAIMER 1,865,474.—*Malvin R. Mandelbaum*, Elizabeth, N. J. REFINING HYDROCARBONS. Patent dated July 5, 1932. Disclaimer filed March 16, 1938, by the assignee, *The Gray Processes Corporation*.

Hereby enters this disclaimer to claims 1, 2, and 8 of said Letters Patent.

[*Official Gazette April 19, 1938.*]